June 8, 1948.　　　　　B. HORWITZ　　　　　2,443,004
SLIT LENS FOR SOUND REPRODUCTION APPARATUS Filed March 22, 1946　　　　　　　　　　2 Sheets-Sheet 1

INVENTOR.
BENJAMIN HORWITZ
BY
Maurice S. Cayne
ATTORNEY

June 8, 1948.                B. HORWITZ                2,443,004
          SLIT LENS FOR SOUND REPRODUCTION APPARATUS
Filed March 22, 1946                              2 Sheets-Sheet 2

INVENTOR
BENJAMIN HORWITZ
By
    Maurice S. Cayne
            ATTORNEY

Patented June 8, 1948

2,443,004

UNITED STATES PATENT OFFICE 2,443,004

SLIT LENS FOR SOUND REPRODUCTION APPARATUS

Benjamin Horwitz, Chicago, Ill., assignor, by mesne assignments, to Helene Curtis Industries, Inc., a corporation of Illinois Application March 22, 1946, Serial No. 656,431

2 Claims. (Cl. 88—24)

1

The present invention relates to improvements in slit lens of a kind that is used to direct a sharply defined beam of light through the photographic sound track on a motion picture film and onto a photo-electric cell electrically connected with sound reproducing apparatus.

Slit lenses of a kind commonly used usually consist of a structure involving difficult problems of manufacture and assembly and are, therefore, extremely costly to manufacture. Such known type of slit lens often includes a plurality of refraction elements and other parts necessarily arranged therein with such precise exactness as to require the employment of highly skilled mechanics in their manufacture and at least semi-skilled labor for assembly.

The slit lens of the present invention is such as to require but a minimum number of parts which can be manufactured inexpensively, and easily and quickly be assembled by unskilled labor. It is, therefore, an object of the present invention to provide a slit lens that is not expensive to manufacture, but which is easy to assemble and when in use has the same high degree of performance as known types of slit lenses involving more costly manufacturing and assembling processes.

Another object of the invention is to provide a slit lens having but a single refraction element therein.

Another object is to provide a slit lens of a kind which consists substantially of parts that are easily machined for quick and simple assembly.

Other and further objects of the present invention will be apparent from the following description and claims and are illustrated in the accompanying drawings which illustrate preferred embodiments and the principle thereof and which are considered to be the best modes contemplated for applying that principle. Other embodiments of the invention embodying the same or equivalent principle may be used and the structural changes may be made as desired by those skilled in the art without departing from the spirit of the present invention and the purview of the appended claims.

2

Figure 2:
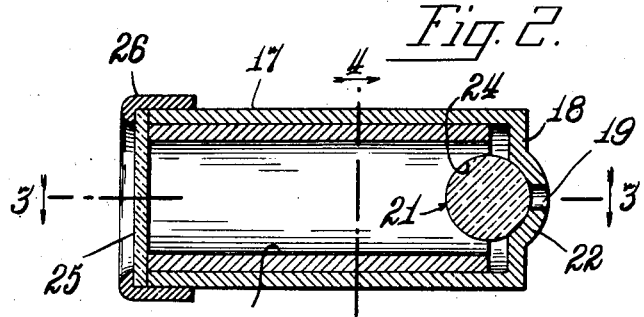
Fig. 2 is an enlarged longitudinal sectional detail view through one embodiment of the slit lens.
Figure 3:
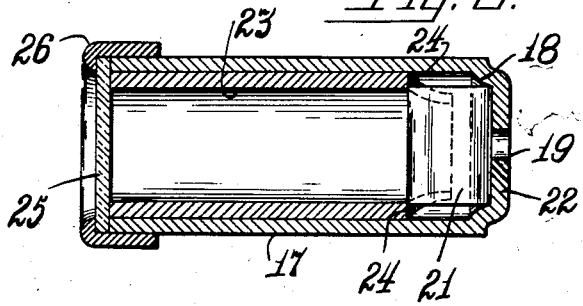

Fig. 3 is a longitudinal detail view taken substantially on line 3—3 of Fig. 2.

Figure 4:
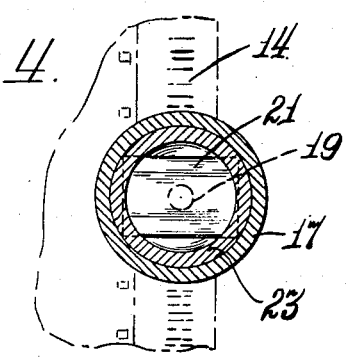

Fig. 4 is a transverse sectional view taken on line 4—4 of Fig. 2.

Figure 5:
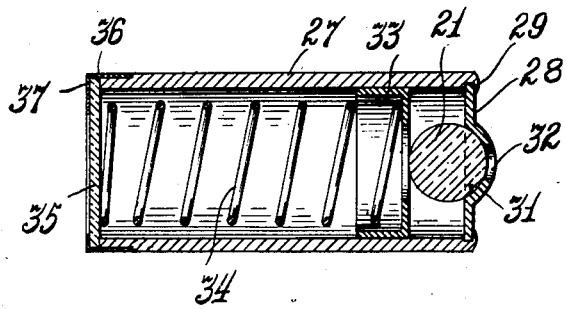

Fig. 5 is a longitudinal sectional detail view through a modified form of slit lens construction.

Figure 6:
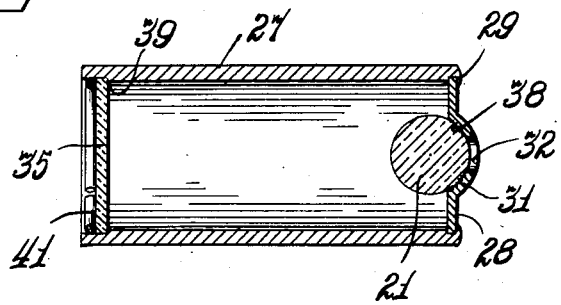

Fig. 6 is a longitudinal sectional detail view through another modified form of slit lens construction.

A slit lens of the kind embodying the present invention usually is associated with and mounted upon a projection apparatus of a kind used for projecting pictures upon a screen from a moving film threaded therethrough in a manner that is well known and, consequently, will not be further described herein. Film used in such projection machines frequently is provided on one of its longitudinal edges with a photographic sound track bearing a succession of opaque and translucent areas of varying sizes or of varying intensity through which a beam of light of uniform intensity is projected. Light rays passing through said sound track are of various degrees of intensity so as to thereby activate a photo-electric cell arranged in their path. This photo-electric cell is, of course, electrically connected with sound reproducing apparatus. In this manner sound is reproduced in conjunction with the reproduction of the pictures carried by the film.

Figure 1:
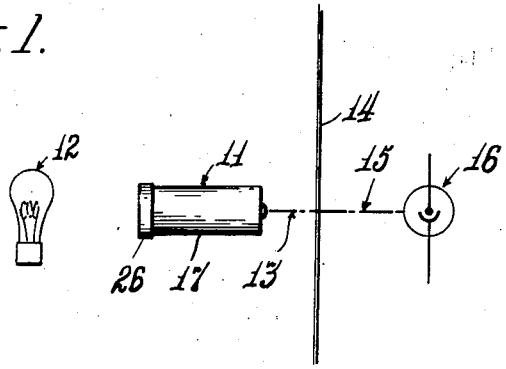
Fig. 1 is a diagrammatic view illustrating the relative location of the slit lens in a sound projection apparatus.

As best shown in Fig. 1 of the accompanying drawing, the slit lens, generally indicated at 11, is mounted in such a position that rays of light emitted from an exciter lamp 12 pass therethrough and are directed in the form of an intense beam, as at 13, onto the sound track 14 (Fig. 4). The variable light beam 15 passing through the sound track is directed upon the photo-electric cell 16.

It should be quite evident that accurate reproduction of sound, represented by the varying degrees of transparency and opaqueness or the variously sized areas on the sound track, can be obtained only if the beam of light 13 directed thereon is constant and of the required intensity and size. It is, therefore, essential that most of the rays of light entering the slit lens 11 be concentrated within the area of the beam 13 passing therefrom onto the sound track. To this end the slit lens is provided with a refraction element located directly in the path of the rays of light entering the slit lens.

The improved slit lens shown in Figs. 2, 3 and 4 preferably includes an outer tubular shell 17 having an end wall 18 substantially closing one end thereof. The end wall 18 is provided with a slit opening or hole 19, preferably of a width or diameter equal to the width of the sound track on the film, through which opening the beam of light 13 passes. A single refraction element 21 is arranged within the outer tubular shell 17 directly behind the slit opening 19. In the present disclosure the refraction element is fashioned from a length of rod formed of optical glass "Lucite," "Plexiglas," ordinary glass, or similar transparent material, and it is preferred that the inside face of the end wall 18 be formed with a diametrical recess 22 preferably having a radius corresponding to the radius of the refraction element 21 to provide a seat within which the refraction element is rested.

The refraction element 21 is held in position on the seat 22 by means of an inner tube 23 which is telescoped into the outer tubular shell 17 and is formed on its inwardly disposed end with a pair of diametrically opposed notches or like cutouts 24 of sufficient size to snugly embrace and bear against the refraction element when the tube is properly positioned within the outer tubular shell.

The inner tube 23 is held in place preferably by means of a clear transparent cover plate 25, fashioned from clear glass, "Lucite," or similar transparent material, which is of a sufficiently large diameter as to rest upon the free edge of the outer tubular shell, as shown. A retaining cap 26 of such diameter as to have a snug fit on the outer tubular shell is fitted thereover to retain the transparent plate 25 in position. Obviously, the retaining cap 26 may be screw threaded onto the end of the outer tubular shell.

In use, the slit lens is positioned so that rays of light emitted from the exciter lamp 12 enter the interior of the inner tube 23 through the transparent plate 25. The rays of light strike the refraction element 21, and they are refracted in passing through said refraction element and pass therefrom in the form of an intense narrow light beam limited in its length to the width or diameter of the slit opening 19. In this manner the light beam 13 passing out through the slit opening 19 has a relatively greater intensity than the intensity of the scattered light rays entering the slit lens.

Although the construction disclosed in Figs. 2, 3 and 4 contemplates the use of the seating recess 22 and the notches 24 for cooperatively embracing the refraction element 21 so as to thereby prevent its displacement, it is within the spirit of the invention to dispense with one or the other of said embracing means since it is quite evident that displacement of the refraction element can be effectively prevented either by the use of the recess 22 or the notches 21. In the event that the recess 22 is omitted, the end wall 18 of the outer tubular shell 17 will be made substantially flat and should the notches 24 be omitted, the innermost end of the inner tube 23 will be straight so as to have binding contact only with the refraction element 21.

The slit lens shown in Fig. 5 performs substantially like the slit lens shown in Figs. 2 to 4, inclusive, and described in detail hereinabove. In this disclosure the slit lens includes a tubular shell 27 having an end wall 28 preferably fashioned from thin sheet material and secured over one end of the tubular shell 17 by being swedged thereon, as at 29. The end wall 28 is provided with a diametrical recess 31 formed by stamping or otherwise upsetting the material thereof, which recess has a slit opening or hole 32 therein. A lens 21, fashioned of a length of rod formed of optical glass, or the like, is arranged within the tubular shell 27 and rested in the diametrical recess 31, as shown.

The lens 21 is retained in place by means of an internally flanged ring 33 having a diameter of such size that the ring will slide freely within the tubular shell 27. This ring is urged into bearing relation with the lens 21 by means of a tension spring 34 which is inserted between the ring 33 and a transparent closure plate 35 mounted on the other end of the tubular shell 27. The transparent closure plate 35 may be held in place by any suitable means. In the present disclosure a band 36, having an internal flange 37 on one end, is fitted over the end of the tubular shell 34. In order for the assembled slit lens to have an uniformly smooth outside surface devoid of any projections, shoulders or other protuberances, the end of said tubular shell over which the band 36 is fitted is recessed annularly to provide a reduced diameter of such size as to receive the band 36 snugly with its outer circumferential surface substantially flush with the outer circumferential surface of the tubular shell 27.

It should be quite evident that the passage of light rays into the tubular shell 27 is not obstructed by the transparent closure plate 35 and that such light rays as impinge upon the lens 21 are refracted so that an intense narrow light beam, having a width corresponding to the diameter of the hole 32, is projected.

The slit lens shown in Fig. 6 is of a construction somewhat like that shown in Fig. 5. In this embodiment, however, the cylindrical lens 21 is adhesively secured, as at 38, to the inside surface of the diametrical recess 31 in the end wall 28, which wall may be secured to one end of the tubular shell 27 in the same manner as in the previously described construction. The transparent closure plate 35 is, in this instance, seated against an internal shoulder 39 located adjacent the other end of the tubular shell 27 and may be held in position by a split ring 41 which is contracted from its normal state so as to bear snugly against the inside wall of the tubular shell 27 and thereby resist displacement.

It should be quite evident that the slit lens structure shown in Fig. 6 is capable of performing in the same manner as the slit lens shown in the previously described disclosures and that each of the devices disclosed herein is capable of embodying various modifications in detail construction and assembly without departing from the spirit of the invention or the scope of the appended claims.

I claim:

1. A slit lens comprising an outer tubular shell open at one end and having a wall closing its other end, said wall having an opening therein, the wall being offset outwardly around said opening to provide a semi-cylindrical seat on its inside face, a rodlike refraction element rested on said seat, an inner tube telescoped into the open end of said tubular shell, said tube having portions of its wall adjacent its inner end cut away to engage over the refraction element to retain said element in place, and a transparent closure for the open end of said tubular shell.

2. A slit lens comprising an outer tubular shell open at one end and having a wall closing its other end, said wall having an opening therein, the wall being offset outwardly around said opening to provide a semi-cylindrical seat on its inside face, a rodlike refraction element rested on said seat, an inner tube telescoped into the open end of said tubular shell and arranged when the inner end thereof is in abutting relation with said element to retain the same in place, and resilient means abutting said inner tube and arranged to maintain said tube in abutting relation with said element to retain the same in place.

BENJAMIN HORWITZ.

REFERENCES CITED

The following references are of record in the file of this patent:

UNITED STATES PATENTS

| Number | Name | Date |
| --- | --- | --- |
| 1,935,300 | Smythe | Nov. 14, -933 |
| 1,936,145 | Wente | Nov. 21, 1933 |
| 1,958,996 | Hansen et al. | May 15, 1934 |
| 1,983,697 | Holloway | Dec. 11, 1934 |
| 2,019,152 | Maurer | Oct. 29, 1935 |
| 2,196,583 | Collins | Apr. 9, 1940 |
| 2,236,509 | Manderfeld | Apr. 1, 1941 |
| 2,247,076 | Arey | June 24, 1941 |
| 2,258,223 | Sachtleben | Oct. 7, 1941 |

FOREIGN PATENTS

| Number | Country | Date |
| --- | --- | --- |
| 415,177 | Great Britain | Aug. 23, 1934 |